United States Patent
Richards et al.

(10) Patent No.: US 9,815,653 B2
(45) Date of Patent: Nov. 14, 2017

(54) SYSTEM, APPARATUS AND METHOD FOR DAMPING AND STABILIZING AUTOMATION PICKING AND STACKING

(71) Applicant: Xerox Corporation, Norwalk, CT (US)

(72) Inventors: Paul N. Richards, Fairport, NY (US); Rui Amorim, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 14/705,448

(22) Filed: May 6, 2015

(65) Prior Publication Data
US 2016/0325960 A1 Nov. 10, 2016

(51) Int. Cl.
| | |
|---|---|
| B65H 3/08 | (2006.01) |
| B65H 29/24 | (2006.01) |
| B65H 29/32 | (2006.01) |
| B65G 47/91 | (2006.01) |
| B25J 15/06 | (2006.01) |
| B25J 19/00 | (2006.01) |

(52) U.S. Cl.
CPC ........ *B65H 29/241* (2013.01); *B25J 15/0616* (2013.01); *B25J 19/0091* (2013.01); *B65G 47/918* (2013.01); *B65H 3/0808* (2013.01); *B65H 3/0816* (2013.01); *B65H 3/0833* (2013.01); *B65H 29/32* (2013.01); *B65H 2406/34* (2013.01)

(58) Field of Classification Search
CPC ...... B65H 3/08; B65H 3/0833; B65H 3/0883; B65H 3/0808; B65H 3/54; B65H 3/0816; B25J 15/0052; B25J 15/0616; B25J 15/0061; B65G 47/918
See application file for complete search history.

(56) References Cited

U.S. PATENT DOCUMENTS

| | | | | |
|---|---|---|---|---|
| 5,991,593 A | * | 11/1999 | Sugiyama | B65H 3/0883 271/11 |
| 6,382,693 B1 | * | 5/2002 | Ljungmann | B25J 15/0616 294/188 |
| 6,796,353 B2 | * | 9/2004 | Lang | G01N 1/2813 156/108 |
| 7,926,807 B2 | * | 4/2011 | Dahlgren | B65H 3/0816 271/262 |

(Continued)

FOREIGN PATENT DOCUMENTS

| | | | | |
|---|---|---|---|---|
| EP | 1582486 A1 | * | 10/2005 | ............... B27D 1/00 |
| JP | 01104533 A | * | 4/1989 | |

(Continued)

*Primary Examiner* — Luis A Gonzalez
(74) *Attorney, Agent, or Firm* — Simpson & Simpson, PLLC

(57) ABSTRACT

An apparatus for picking a product, including: at least one vacuum cup including at least one axis passing through the at least one vacuum cup; and at least one damping device surrounding at least a portion of the at least one vacuum cup in a radial direction orthogonal to the at least one axis. The at least one vacuum cup is arranged to create negative pressure and adhere, with the negative pressure, the at least one sheet of material to the at least one vacuum cup. The at least one damping device is arranged to contact the at least one sheet of material to limit displacement of the at least one sheet of material with respect to the at least one vacuum cup.

18 Claims, 9 Drawing Sheets

(56) References Cited

U.S. PATENT DOCUMENTS

| | | | | |
|---|---|---|---|---|
| 7,942,403 B2* | 5/2011 | Dangelewicz | ....... | B65H 3/0816 |
| | | | | 271/106 |
| 2007/0068407 A1* | 3/2007 | Schmitt | ................ | B65H 3/0825 |
| | | | | 101/216 |
| 2010/0080680 A1* | 4/2010 | Okamoto | ............. | B25J 15/0616 |
| | | | | 414/737 |

FOREIGN PATENT DOCUMENTS

| JP | 06336392 A | * | 12/1994 |
|---|---|---|---|
| JP | 08217275 A | * | 8/1996 |
| JP | 09086706 A | * | 3/1997 |

* cited by examiner

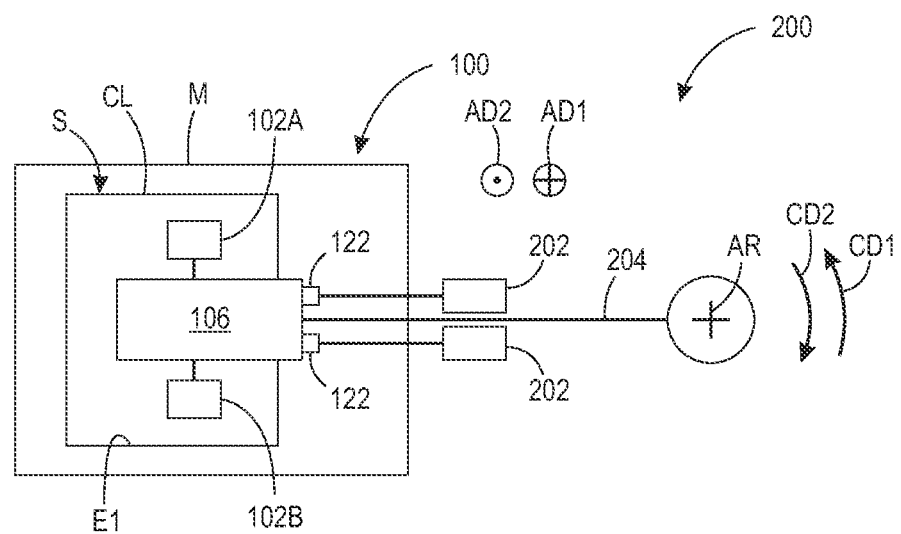
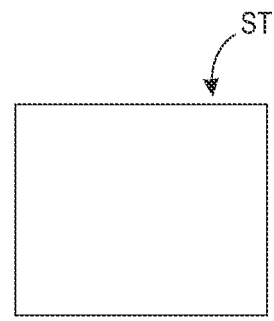
FIG. 4A

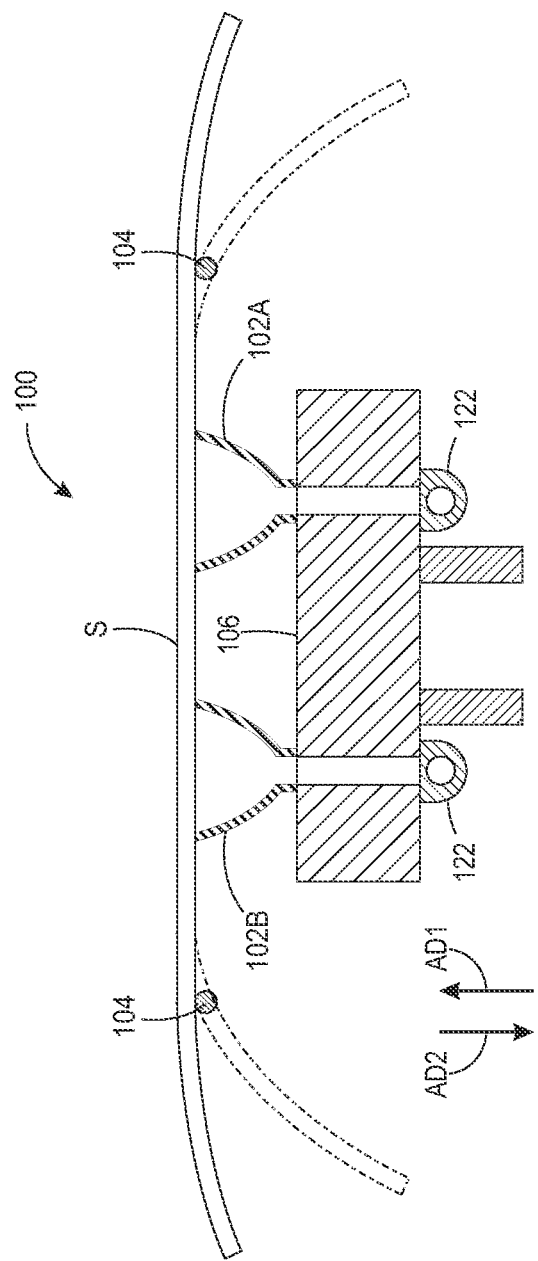

SYSTEM, APPARATUS AND METHOD FOR DAMPING AND STABILIZING AUTOMATION PICKING AND STACKING

TECHNICAL FIELD

The present disclosure relates to a system, apparatus and method for damping and stabilizing automation picking and stacking. In particular, the present disclosure relates to wire forms arranged to limit displacement of, and damping energy from, material picked by vacuum cups and rapidly displaced for stacking.

BACKGROUND

Known automated systems for picking and stacking material, such as print media, use a vacuum cup to pick the material and then displace the cup and media to stack the material in a different location. Typically, the product picking cycle is very rapid, for example 450 milliseconds/full cycle. During picking and acceleration of the material to the different location, the product is deformed, in particular curved, causing difficulties in stacking the product. For example, the product "flaps" about the vacuum cup during transition to the stack. As a result, material stacks become difficult to manage and poorly registered. In many cases, the stacks fall over and require re-printing.

SUMMARY

According to aspects illustrated herein, there is provided an apparatus for picking a product, including: at least one vacuum cup including at least one axis passing through the at least one vacuum cup; and at least one damping device substantially surrounding the at least one vacuum cup in a first circumferential direction. The at least one vacuum cup is arranged to create negative pressure and adhere, with the negative pressure, the at least one sheet of material to the at least one vacuum cup. The at least one damping device is continuous in the first circumferential direction about the at least one vacuum cup and arranged to contact the at least one sheet of material to limit displacement of the at least one sheet of material with respect to the at least one vacuum cup.

According to aspects illustrated herein, there is provided a method of picking and stacking a product, including: displacing, using a robotic arm, at least one apparatus such that at least one vacuum cup for the at least one apparatus is aligned with at least one sheet of material in a first direction; creating negative pressure with the at least one vacuum cup; adhering the at least one sheet of material to the at least one vacuum cup with the negative pressure; displacing the robotic arm and the at least one apparatus in a second direction, orthogonal to the first direction; contacting the at least one sheet of material with at least one damping device, the at least one damping device substantially surrounding the at least one vacuum cup in a first circumferential direction; and limiting, with the at least one damping device, displacement, with respect to the at least one vacuum cup, of the at least one sheet of material in the first direction as the at least one vacuum cup and the at least one sheet displace in the second direction.

According to aspects illustrated herein, there is provided a system for picking and stacking a product, including: a robotic arm; and at least one apparatus connected to the robotic arm and including a plurality of vacuum cups and a plurality of damping device, each damping device substantially surrounding a respective vacuum cup in a first circumferential direction. The plurality of vacuum cups is arranged to create negative pressure and adhere at least one sheet of material to the plurality of vacuum cups with the negative pressure. Each damping device is arranged to contact the at least one sheet of material to limit displacement of the at least one sheet of material, with respect to the plurality of vacuum cups.

BRIEF DESCRIPTION OF THE DRAWINGS

Various embodiments are disclosed, by way of example only, with reference to the accompanying schematic drawings in which corresponding reference symbols indicate corresponding parts, in which:

FIGS. 4A and 4B are respective block diagrams of a system including the apparatus shown in FIG. 2;

FIG. 5 is a schematic representation showing damping by the apparatuses in FIGS. 1 and 2.

DETAILED DESCRIPTION

Moreover, although any methods, devices or materials similar or equivalent to those described herein can be used in the practice or testing of these embodiments, some embodiments of methods, devices, and materials are now described.

Figure 1:
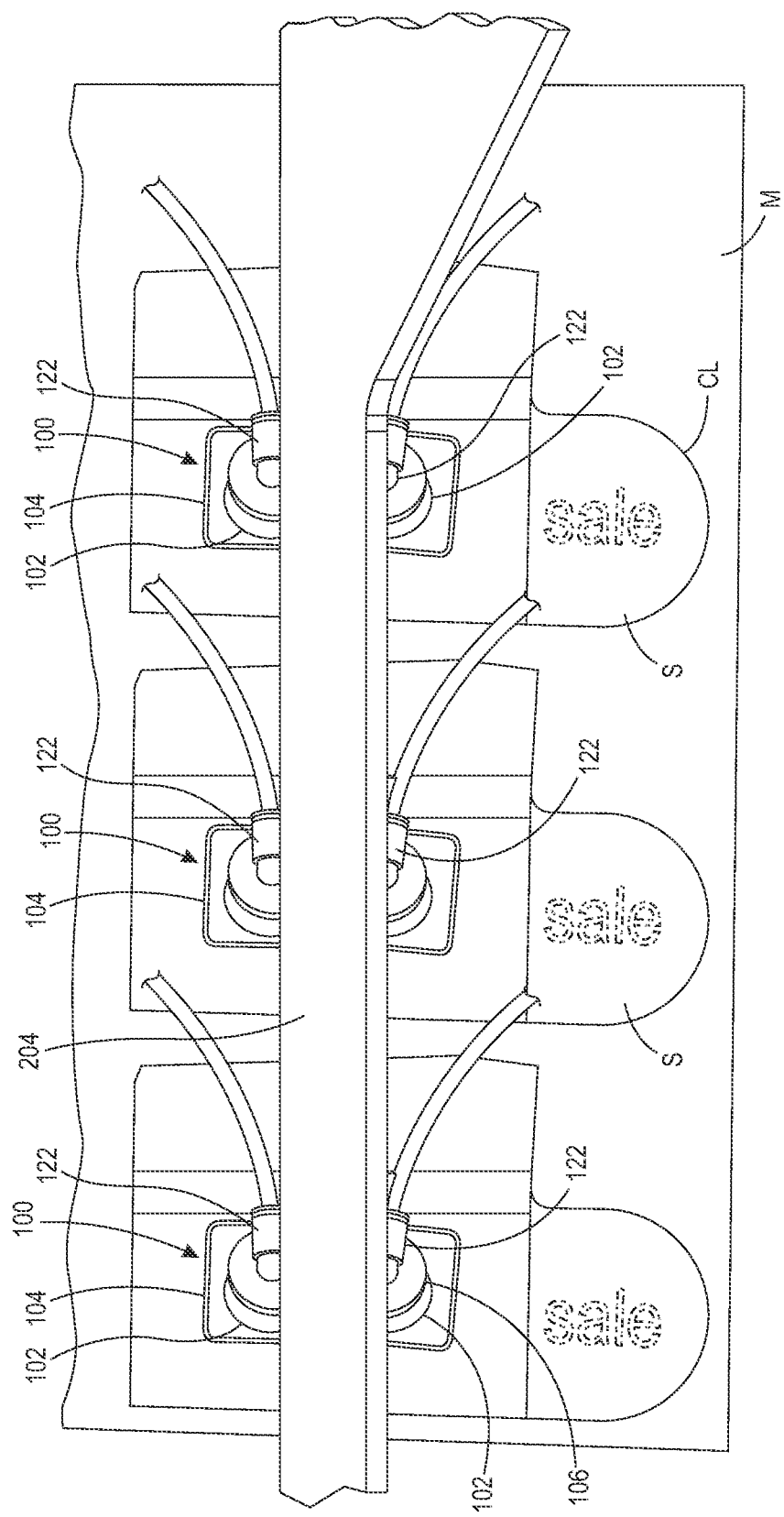
FIG. 1 is a top perspective view of an apparatus for picking and stacking a product.

FIG. 1 is a top perspective view of an apparatus for picking and stacking a product.

Figure 2:
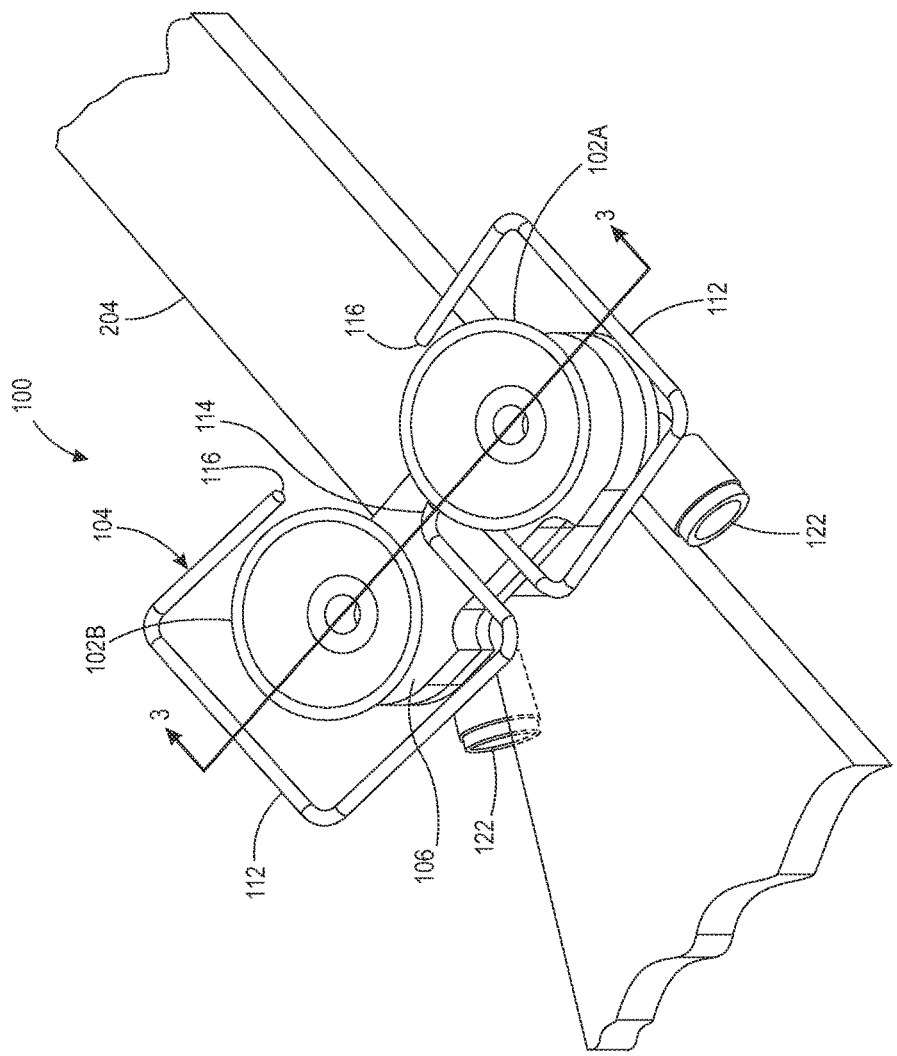
FIG. 2 is a bottom perspective view of an apparatus for picking and stacking a product.

FIG. 2 is a bottom perspective view of an apparatus for picking and stacking a product.

Figure 3A:
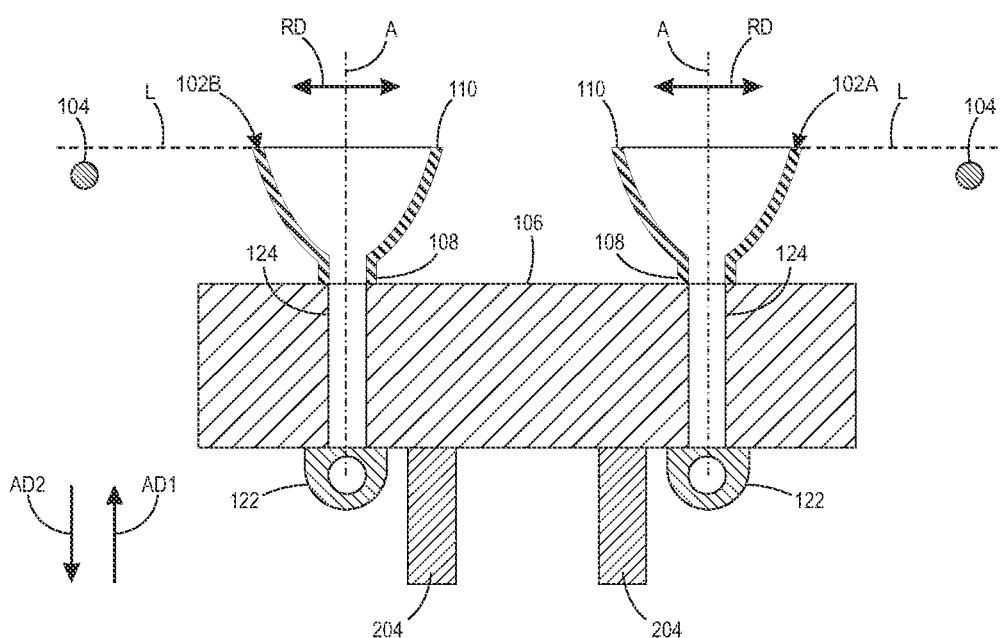
FIGS. 3A through 3C are cross-sectional views of various embodiments taken generally along line 3-3 in FIG. 2.
Figure 3B:
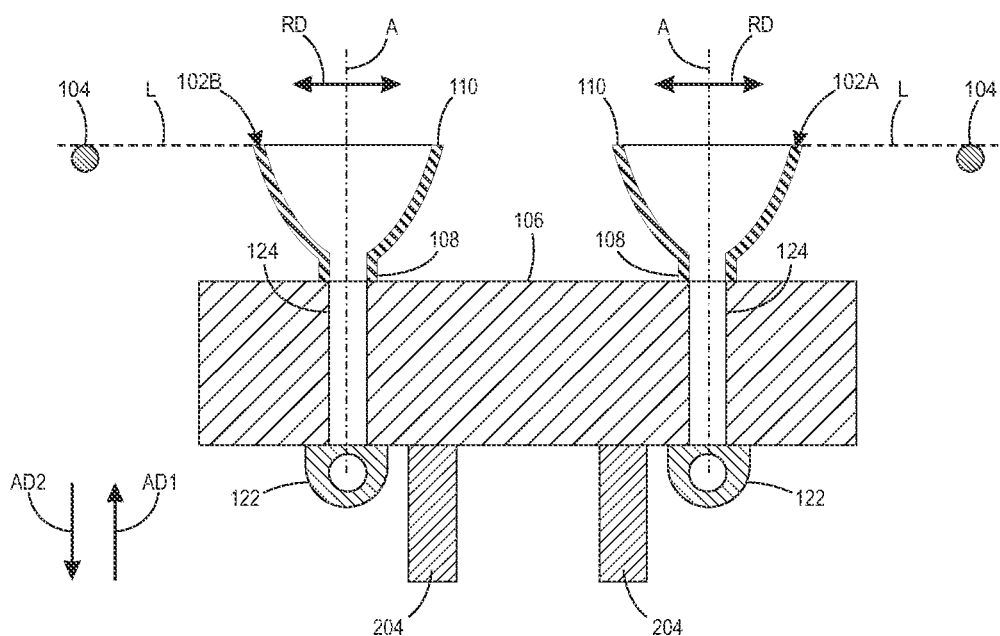
Figure 3C:
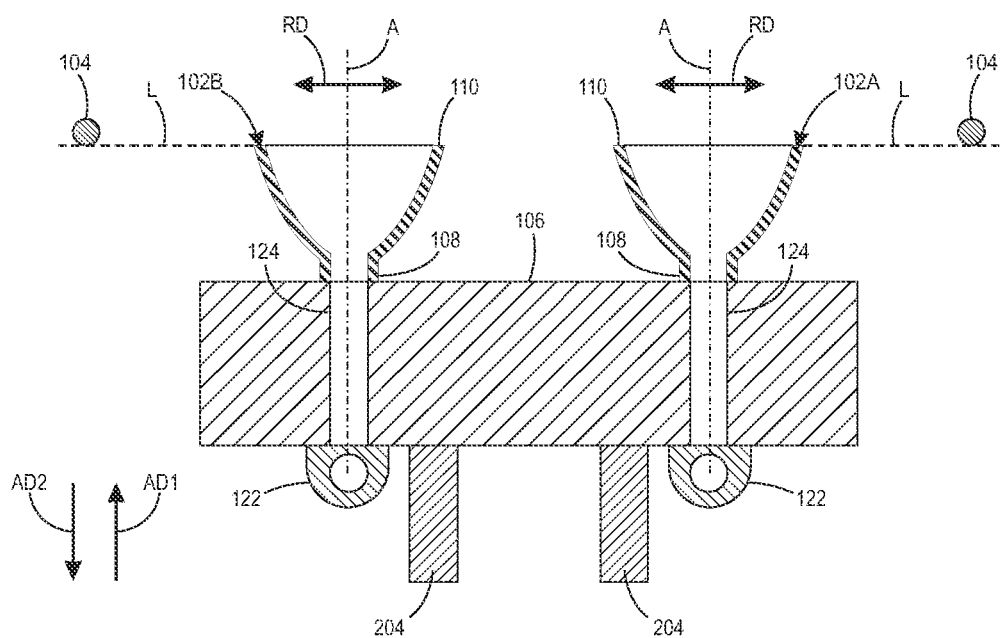

FIGS. 3A through 3C are cross-sectional views of various embodiments taken generally along line 3-3 in FIG. 2. The following should be viewed in light of FIGS. 1 through 3C. Apparatus 100 includes at least one vacuum cup 102. In an example embodiment, for example as shown in FIGS. 1 through 3C, apparatus 100 includes multiple cups 102. Although two cups 102 are shown in FIGS. 1 through 3, it should be understood that apparatus 100 can include only one cup 102 or more than two cups 102. The discussion that follows is directed to an apparatus 100 with multiple cups 102; however, it should be understood that the discussion is applicable to an apparatus 100 with only a single cup 102 unless indicated otherwise.

Apparatus 100 includes: at least one damping device 104; and a respective axis A passing through each cup 102. Each damping device 104 surrounds at least a portion of a respective vacuum cup 102 in a circumferential direction CD1. Each vacuum cup 102 is arranged to create negative pressure and adhere, with the negative pressure, at least one sheet of material S (hereinafter referred to as "sheet S") to vacuum cup 102. By "negative pressure" we mean a pressure less than the ambient air pressure surrounding cup 102. As further described below, each damping device 104 is arranged to contact sheet S to limit displacement of sheet S with respect vacuum cups 102. Stated otherwise, damping device 104 is arranged to contact sheet S to dampen energy associated with displacement of sheet S with respect to vacuum cups 102.

Apparatus 100 includes body 106. Each vacuum cup 102 includes: end 108 connected to body 106; and end 110 arranged to contact sheet S. Each axis A extends from end 108 to end 110 in axial direction AD1. In FIG. 3A, cups 102A and 102B extend past device 104 in direction AD1, as shown by line L, which designates the furthest extent of cups 102A and 102B in direction AD1. In FIG. 3B, no portion of damping devices 104 extend past vacuum cups 102A and 102B in direction AD1; in particular, devices 104 and cups 102A and 102B extend a same distance in direction AD1, as shown by line L, which designates the furthest extent of cups 102A and 102B in direction AD1. In FIG. 3C, devices 104 extend past cups 102A and 102B in direction AD1, as shown by line L, which designates the furthest extent of cups 102A and 102B in direction AD1.

Devices 104 are flexible, for example, at least respective portions 112 of damping devices 104 are displaceable, with respect to cups 102, in direction AD1 and direction AD2, opposite direction AD1. For example in FIG. 2, portion 114 is fixed to body 106 and portions 112 are flexible and displaceable, with respect to cups 102, in directions AD1 and AD2. In the example embodiment of FIGS. 1 through 3C, single device 104 surrounds portions of cups 102A and 102B. However, it should be understood that a separate device 104 can be associated with each cup 102.

In an example embodiment: each damping device 104 is formed of a wire with one portion, such as portion 114, fixed to body 106; and each damping device 104 also includes at least one distal end 116 free of connection to body 106 or cups 102. The wire can have any cross-section known in the art, for example, any combination of a circular circumference, an arcuate circumference, or a circumference with straight portions, for example a polygon or portion of a polygon.

Apparatus 100 is controllable such that: negative pressure is created, simultaneously, by less than all of vacuum cups 102; or the negative pressure is created, simultaneously, by every vacuum cup 102. For example, negative pressure is created by cup 102A at a first point in time and at a second point in time, following the first point in time, negative pressure is created by cup 102B. The negative pressure at cup 102A can be maintained or released when the negative pressure is created by cup 102B. Thus, the generation of negative pressure in cups 102A and 102B is independently controllable.

Figure 4B:
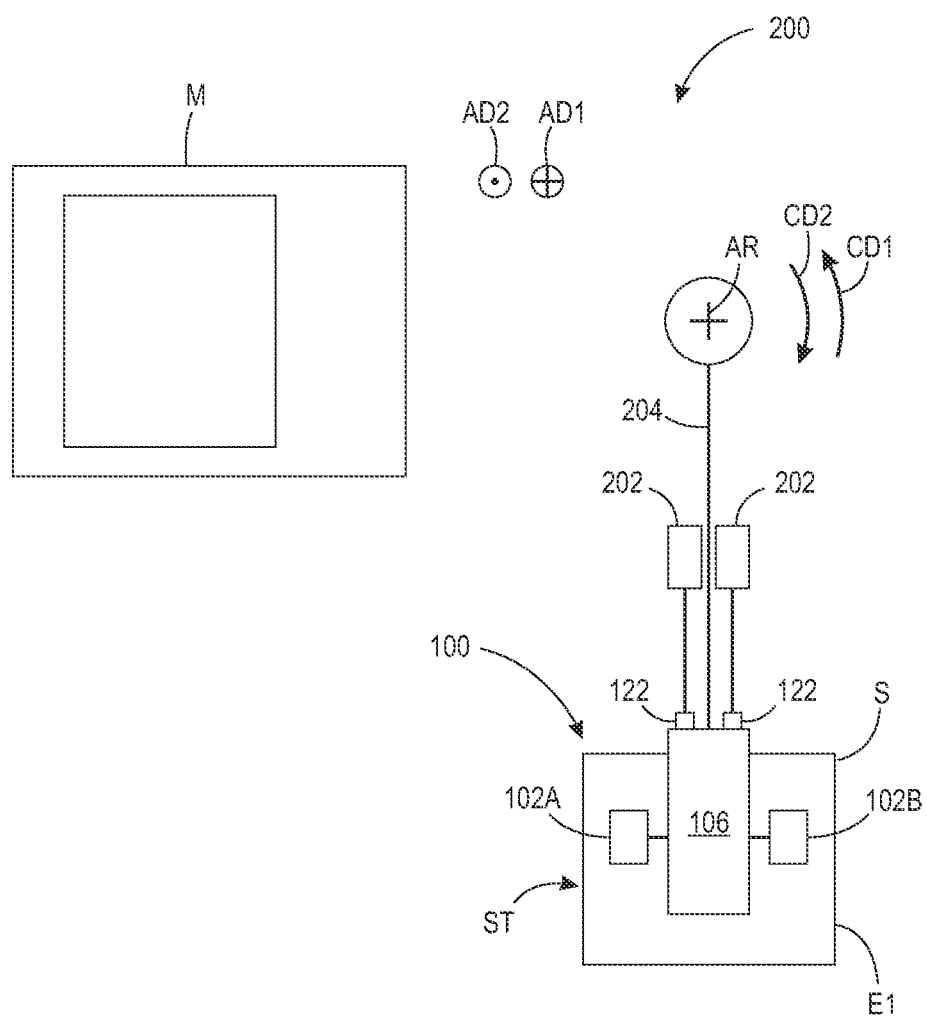

FIGS. 4A and 4B are respective block diagrams of system 200 including apparatus 100. Apparatus 100 includes at least one port 122 arranged to be connected to at least one vacuum pump 202. Vacuum pumps 202 are arranged to generate the negative pressures described above. Body 106 includes at least one channel 124 connecting the at least one port 122 to the one or more vacuum cups. In an example embodiment, apparatus 100 includes a separate port 122 and a separate channel 124 for each cup 102, to enable individual control of negative pressure at each cup 102.

System 200 includes robotic arm 204. In the example of FIG. 1, three apparatuses 100 are connected to arm 204. In the example of FIGS. 2 and 5, only one apparatus 100 is connected to arm 204. Arm 204 is displaceable parallel to axis AR (in directions AD1 and AD2 into and out of the sheet, respectively) and rotatable about axis AR in circumferential directions CD1 and CD2. As shown in FIG. 4A, arm 204 is controllable to rotate in direction CD1 in the example of FIG. 4A to position apparatus 100 above sheet S in direction AD1. As described above, vacuum pumps 202A and 202B are arranged to generate negative pressure at cups 102A and 102B, respectively. The negative pressure is arranged to draw sheet S toward cups 102A and 102B in direction AD2 and adhere sheet S to cups 102A and 102B.

FIG. 5 is a schematic representation showing damping by apparatus 100. FIG. 5 is based on FIG. 3B. As shown in FIG. 4B, arm 204 is controllable to rotate in direction CD1 to position sheet S over stack ST in direction AD2. The negative pressure is released from apparatus 100 so that sheet S falls in direction AD2 onto stack ST. During the displacement of sheet S in direction AD2 and the adhesion of sheet S to cups 102, damping device 104 contacts sheet S to limit displacement of sheet S in direction AD2. During the rotation of arm 204 and sheet S in direction CD1, damping device 104 contacts sheet S to damp energy associated with sheet displacing, or flapping, in directions AD1 and AD2. The dashed lines in FIG. 5 represent displacement of sheet S without damping device 104. The solid lines show displacement of sheet S with damping device 104 in place. As seen in FIG. 5, there is much less displacement of sheet S in direction AD2 with device 104 in place. Because of the limited displacement of sheet S in direction AD2, there is less flapping of sheet S in direction AD1 as well, since energy in sheet S is being absorbed and damped by device 104 and there is less "windup" in direction AD2.

Figure 6:
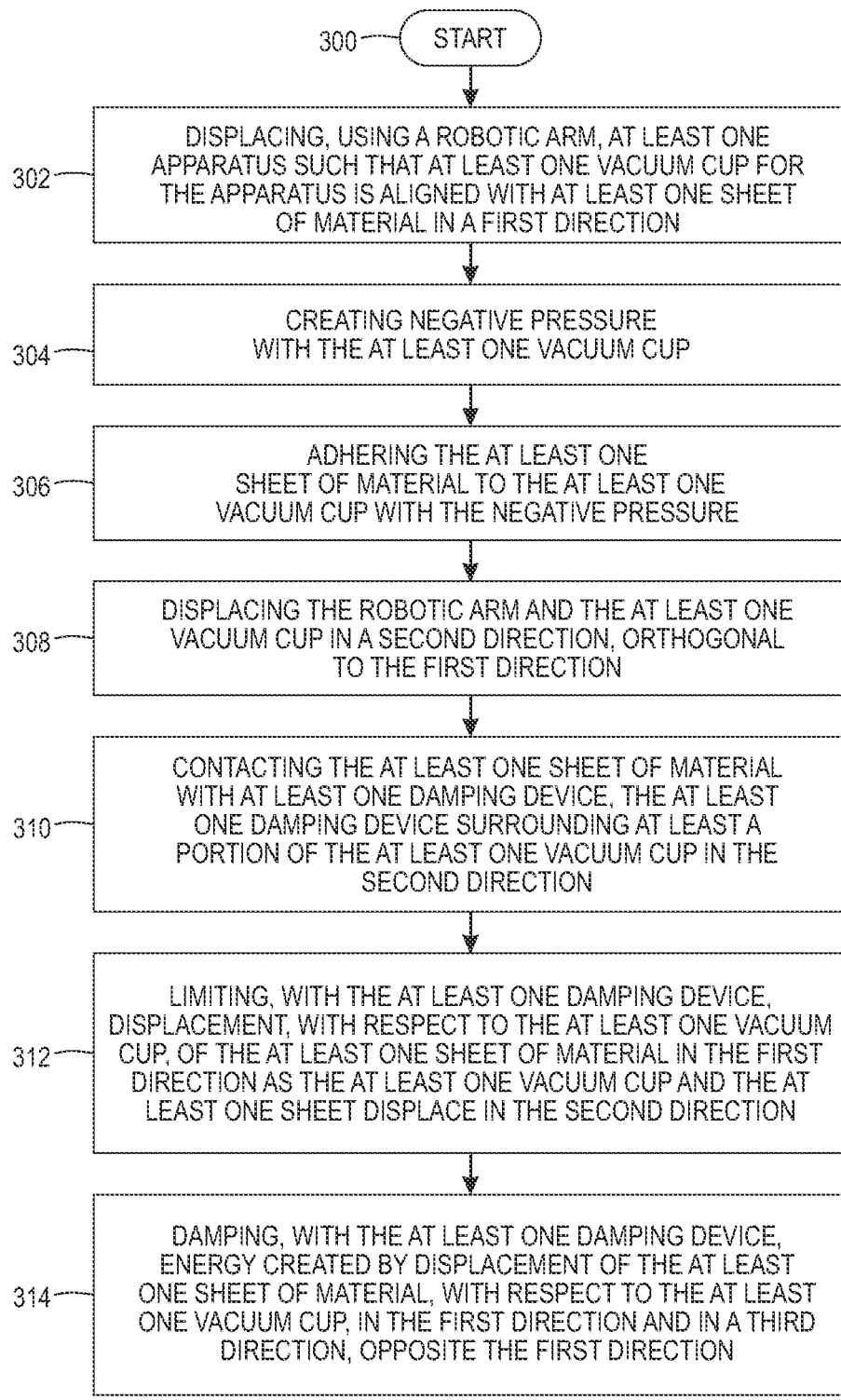
FIG. 6 is a flow chart illustrating a method of picking and stacking a product.

FIG. 6 is a flow chart illustrating a method of picking and stacking a product. Although the method in FIG. 6 is depicted as a sequence of numbered steps for clarity, no order should be inferred from the numbering unless explicitly stated. The method starts at Step 300. Step 302 displaces, using a robotic arm, at least one apparatus such that at least one vacuum cup for the apparatus is aligned with at least one sheet of material in a first direction. Step 304 creates negative pressure with the at least one vacuum cup. Step 306 adheres the at least one sheet of material to the at least one vacuum cup with the negative pressure. Step 308 displaces the robotic arm and the at least one vacuum cup in a second direction, orthogonal to the first direction. Step 310 contacts the at least one sheet of material with at least one damping device, the at least one damping device surrounding at least a portion of the at least one vacuum cup in the first circumferential direction CD1. Step 312 limits, with the at least one damping device, displacement, with respect to the at least one vacuum cup, of the at least one sheet of material in the first direction as the at least one vacuum cup and the at least one sheet displace in the second direction.

Step 314 damps, with the at least one damping device, energy created by displacement of the at least one sheet of material, with respect to the at least one vacuum cup, in the first direction and in a third direction, opposite the first direction.

In an example embodiment, contacting the at least one sheet of material with the at least one damping device includes: contacting the at least one sheet of material with the at least one damping device extending past the respective vacuum cup device in a second direction, opposite the first direction; or contacting the at least one sheet of material with no portion of the at least one damping device extending past the respective vacuum cup device in a second direction, opposite the first direction.

In an example embodiment: creating negative pressure with the at least one vacuum cup includes creating negative pressure with a plurality of vacuum cups; adhering the at least one sheet of material to the at least one vacuum cup includes adhering the at least one sheet of material to the plurality of vacuum cups; and contacting the at least one sheet of material with at least one damping device includes contacting the at least one sheet of material with a respective damping device at least partially surrounding, in the circumferential direction CD1, a respective vacuum cup device.

In an example embodiment: creating negative pressure with a plurality of vacuum cups includes: creating, simultaneously, the negative pressure in less than all of the vacuum cups included in the plurality of vacuum cups; or creating, simultaneously, the negative pressure in every vacuum cup included in the plurality of vacuum cup assemblies.

Advantageously, the method described above, apparatus 100 and system 200: limit displacement of sheet S in direction AD1 and subsequent curving of sheet S; and damp flapping of sheet S in directions AD1 and AD2 during rotation of the robotic arm. As a result, the problems noted above with respect to transferring and stacking material are greatly reduced, if not eliminated. Further, individual control of cups 102 enables a more advantageous picking process. For example, when apparatus 100 in FIG. 2 is used to pick up sheet S in FIG. 4A, negative pressure is first generated at cup 102B to lift edge E1 of sheet S and then negative pressure is generated at cup 102A. This sequence peels sheet S from material M from which sheet S is cut, ensuring a cleaner separation of sheet S from material M along cut lines CL.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus for picking a product, comprising:
at least one vacuum cup including at least one axis passing through the at least one vacuum cup; and,
at least one damping device substantially surrounding the at least one vacuum cup in a first circumferential-direction, wherein:
the at least one vacuum cup is arranged to:
create negative pressure; and,
adhere, with the negative pressure, at least one sheet of material to the at least one vacuum cup; and,
the at least one damping device includes at least one resilient device with at least a portion fixed with respect to the at least one vacuum cup, the at least one damping device is continuous in the first circumferential direction about the at least one vacuum cup and arranged to contact the at least one sheet of material to limit displacement of the at least one sheet of material with respect to the at least one vacuum cup.

2. The apparatus of claim 1, wherein the at least one damping device is arranged to contact the at least one sheet of material to dampen energy associated with displacement of the at least one sheet of material with respect to the at least one vacuum cup.

3. The apparatus of claim 1, further comprising:
a body, wherein:
the at least one vacuum cup includes:
at least one first end connected to the body; and,
at least one second end arranged to contact the sheet of material; and,
the at least one axis extends from the at least one first end to the at least one second end in a first axial direction.

4. The apparatus of claim 3, wherein:
the at least one damping device extends past the at least one vacuum cup in the first axial direction; or,
no portion of at least one damping device extends the at least one vacuum cup in the first axial direction; or,
the at least one vacuum cup extends past the at least one damping device in the first axial direction.

5. The apparatus of claim 3, wherein the at least one damping device is displaceable, with respect to the at least one vacuum cup, in:
the first axial direction; or,
a second axial direction opposite the first axial direction.

6. The apparatus of claim 1, wherein:
the at least one vacuum cup includes a plurality of vacuum cups; and,
the apparatus is controllable such that:
the negative pressure is created, simultaneously, by less than all of the vacuum cups in the plurality of vacuum cups; or,
the negative pressure is created, simultaneously, by every vacuum cup in the plurality of vacuum cups.

7. The apparatus of claim 1, further comprising:
a body, wherein:
the at least one vacuum cup is directly connect to the body; and,
the at least one damping device is formed of at least one wire including:
at least one portion fixed to the body; and,
at least one distal end free of connection to the body or the at least one vacuum cup.

8. The apparatus of claim 1, further comprising:
a body; and,
at least one port arranged for connection to a vacuum pump, wherein:
the at least one vacuum cup is directly connect to the body; and,
the body includes at least one channel connecting the at least one port to the at least one vacuum cup.

9. A method of picking and stacking a product, comprising:
displacing, using a robotic arm, at least one apparatus such that at least one vacuum cup for the at least one apparatus is aligned with at least one sheet of material in a first direction;
creating negative pressure with the at least one vacuum cup;
adhering the at least one sheet of material to the at least one vacuum cup with the negative pressure;
displacing the robotic arm and the at least one apparatus in a second direction;
contacting the at least one sheet of material with at least one damping device, the at least one damping device substantially surrounding the at least one vacuum cup and continuous in a first circumferential direction; and,
limiting, with the at least one damping device, displacement, with respect to the at least one vacuum cup, of the at least one sheet of material in the first direction as the at least one vacuum cup and the at least one sheet displace in the second direction,
wherein the at least one damping device includes at least one resilient device with at least one portion fixed with respect to the at least one vacuum cup.

10. The method of claim 9, further comprising:
damping, with the at least one damping device, energy created by displacement of the at least one sheet of material, with respect to the at least one vacuum cup, in the first direction and in a third direction, opposite the first direction.

11. The method of claim 9, wherein contacting the at least one sheet of material with the at least one damping device includes:
contacting the at least one sheet of material with the at least one damping device extending past the respective vacuum cup device in a third direction, opposite the first direction; or,
contacting the at least one sheet of material with no portion of the at least one damping device extending past the respective vacuum cup device in a third direction, opposite the first direction.

12. The method of claim 9, wherein:
creating negative pressure with the at least one vacuum cup includes creating negative pressure with a plurality of vacuum cups;
adhering the at least one sheet of material to the at least one vacuum cup includes adhering the at least one sheet of material to the plurality of vacuum cups; and,
contacting the at least one sheet of material with at least one damping device includes contacting the at least one sheet of material with a respective damping device substantially surrounding, in the second direction, a respective vacuum cup device.

13. The method of claim 12, wherein creating negative pressure with a plurality of vacuum cups includes:
creating, simultaneously, the negative pressure in less than all of the vacuum cups included in the plurality of vacuum cups; or,
creating, simultaneously, the negative pressure in every vacuum cup included in the plurality of vacuum cup assemblies.

14. A system for picking and stacking a product, comprising:
a robotic arm; and,
at least one apparatus connected to the robotic arm and including:
a plurality of vacuum cups; and,
a plurality of damping devices, each damping device substantially surrounding a respective vacuum cup in a first circumferential direction, wherein:
the plurality of vacuum cups is arranged to:
create negative pressure; and,
adhere at least one sheet of material to the plurality of vacuum cups with the negative pressure; and,
said each damping device includes a respective resilient device with a portion fixed with respect to the respective vacuum cup, said each damping device is continuous in the first circumferential direction and arranged to contact the at least one sheet of material to limit displacement of the at least one sheet of material, with respect to the plurality of vacuum cups, in a first axial direction, orthogonal to the first direction.

15. The apparatus of claim 14, wherein:
said each damping device extends past the respective vacuum cup in a second axial direction, opposite the first axial direction; or,
no portion of said each damping device extends past the respective vacuum cup in a second axial direction, opposite the first axial direction.

16. The apparatus of claim 14, wherein said each damping device is arranged to contact the at least one sheet of material to limit displacement of the at least one sheet of material, with respect to the plurality of vacuum cups, in the first axial direction, while the robotic arm, the apparatus, and the at least one sheet of material are displacing in the first direction.

17. The apparatus of claim 14, wherein the apparatus is controllable such that:
the negative pressure is created, simultaneously, by less than all of the vacuum cups in the plurality of vacuum cups; or,
the negative pressure is created, simultaneously, by every vacuum cup in the plurality of vacuum cups.

18. The apparatus of claim 14, wherein said each damping device is displaceable, with respect to the respective vacuum cup, in:
the first axial direction; and,
a second axial direction, opposite the first axial direction.

* * * * *